G. CHROMY.
APPARATUS FOR PULLING HAY.
APPLICATION FILED APR. 15, 1918.
1,287,230.
Patented Dec. 10, 1918.
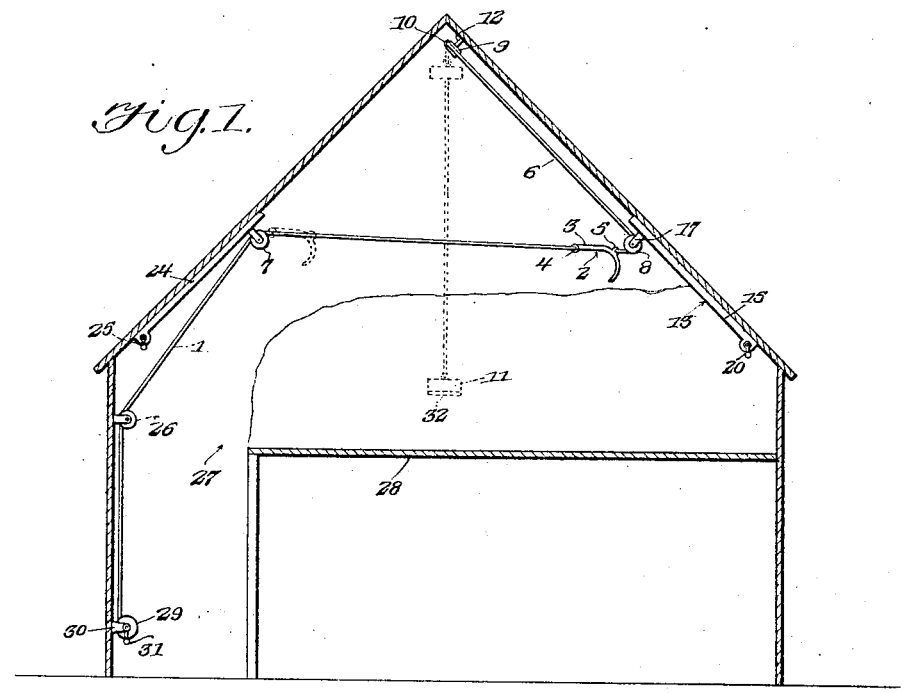
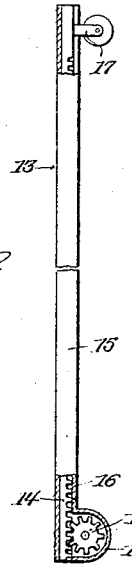
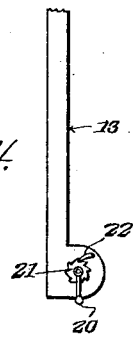
Inventor
George Chromy,
By Victor J. Evans
Attorney

UNITED STATES PATENT OFFICE.

GEORGE CHROMY, OF STEWART, MINNESOTA.

APPARATUS FOR PULLING HAY.

1,287,230.

Specification of Letters Patent.

Patented Dec. 10, 1918.

Application filed April 15, 1918. Serial No. 228,706.

*To all whom it may concern:*

Be it known that I, GEORGE CHROMY, a citizen of the United States, residing at Stewart, in the county of McLeod and State of Minnesota, have invented new and useful Improvements in Apparatus for Pulling Hay, of which the following is a specification.

This invention is an improved apparatus for pulling hay, especially adapted for use for pulling hay, straw or the like from the loft of a barn or stable and dropping the same to the lower floor for feeding or bedding, the object of the invention being to provide an improved apparatus of this kind which is extremely simple in construction, which can be readily installed, and which can be adjusted according to the height of the pile of hay in the loft.

With the above and other objects in view, the invention consists in the construction, combination and arrangement of devices hereinafter described and claimed.

In the accompanying drawing:—

Figure 1 is an outline cross sectional view of a barn or stable provided with a hay pulling apparatus constructed and arranged in accordance with my invention and showing the tackle in initial position in full lines and in loaded condition in dotted lines.

Fig. 2 is a detail elevation, partly in section, of one of the carriers, and its connections.

Fig. 3 is an elevation of the same at right angles to Fig. 1, and with the upper portion of the carrier in section.

Fig. 4 is a detail elevation of the lower portion of the same.

In the embodiment of my invention I provide a tackle which comprises a rope 1 and a hook 2. The hook may be of any suitable construction and may be provided with any suitable number of prongs. The rope is attached to the arm 3 of the hook as at 4 and the hook is provided at a point in the angle between the arm and the prongs with an eye 5 to which a returning rope 6 is attached.

The pulling rope 1 passes over a pulley 7. The returning rope 6 passes under a pulley 8 and also over a pulley 9 and in the form of the invention here shown passes out through an opening 10 in one gable of the barn and is provided with a weight 11. The pulley 9 is mounted in fixed bearings 12 secured under the roof, near the ridge. The pulley 8 is mounted in a carrier 13 which is here shown as a rack bar 14, the rack bar being mounted for sliding movement in a guide 15 and the said guide having a slot 16 in its outer side, extending longitudinally thereof, and through which the supporting bracket 17 of the pulley 8 passes so that said pulley is movable with said rack bar. A pinion 18 is arranged in a casing 19 at the lower end of the guide and engages the rack bar. The axle or shaft of the pinion is provided with a hand crank 20 and is also provided with a ratchet wheel 21. The ratchet wheel is normally engaged by a gravity acting pawl 22 which serves to lock the pinion and hence to cause the pinion to lock the rack bar with the pulley 8 at any desired elevation.

The pulley 7 is also vertically adjustable and is mounted on a carrier 24 which is identical in construction with the carrier 13. The hand crank of the carrier 24 is shown at 25. The pulling rope passes downwardly from the adjustable pulley 7 over a pulley 26 which is mounted in fixed bearings at one side of the barn and opposite the hatch way 27 of the floor 28 of the loft. From the pulley 26 the pulley rope passes downwardly to a winding drum 29 which is mounted in bearings 30 on the said wall of the barn or stable, the drum being provided with a hand crank 31.

The pulleys 7 and 8 of the pulling and returning tackles are arranged at any required elevation, according to the height of the pile of hay or straw on the floor of the loft. Normally the weight 11 by pulling downwardly on the outer end of the returning rope 6 pulls the hook to the side of the loft farthest from the hatch way, the downward movement of the weight being limited by a suitable stop 32. Assuming that the pulling rope is slack the hook drops into the pile of hay and becomes loaded. The operator then turns the drum 29 in the required direction to cause the pulling rope to pull the loaded hook toward the hatch way and when the hook reaches the pulley 7 the hay will drop therefrom down through the hatch way to the lower floor as will be understood. As soon as the drum is released the weight 11 will then cause the return tackle to draw the hook back to initial position.

My improved hay pulling apparatus is extremely cheap and simple, can be readily installed in the loft of an ordinary barn or stable, can be adjusted according to the height of the pile of hay in the loft and can be readily operated. Its use greatly lessens the labor of throwing down the hay or straw from the loft for feeding or bedding purposes.

While I have herein shown and described a preferred embodiment of my invention, I would have it understood that changes may be made in the form, proportion and construction of the several parts, without departing from the spirit of my invention, and within the scope of the appended claims.

Having described the invention, what is claimed as new is:—

1. In apparatus of the class described, a tackle including a rope and a pulley, a hook attached to the rope, a movable carrier in which the pulley is mounted, means to move the carrier to any desired adjusted position, a weighted return tackle attached to the hook and serving to return the hook to initial position, a second movable carrier having a pulley with which the rope of the return tackle is engaged, and means to adjust the second carrier to any desired position.

2. In apparatus of the class described, a tackle including a rope and a pulley, a guide, a rack bar movable longitudinally in the guide, the said pulley being mounted on and movable with said rack bar, and a pinion having fixed bearings and engaging the rack bar, and means to revolve the pinion and means to lock the pinion against rotation.

In testimony whereof I affix my signature.

GEORGE CHROMY.

Copies of this patent may be obtained for five cents each, by addressing the "Commissioner of Patents, Washington, D. C."